United States Patent [19]

Krampe

[11] Patent Number: 5,063,795
[45] Date of Patent: Nov. 12, 1991

[54] STRIPPING TOOL

[76] Inventor: Josef Krampe, An der Vogelrute 32, 4715 Ascheberg-Herbern, Fed. Rep. of Germany

[21] Appl. No.: 596,875

[22] Filed: Oct. 12, 1990

[30] Foreign Application Priority Data

Oct. 12, 1989 [DE] Fed. Rep. of Germany ....... 3934117
Mar. 28, 1990 [DE] Fed. Rep. of Germany ....... 4009870

[51] Int. Cl.[5] .............................................. H02G 1/12
[52] U.S. Cl. .................................................. 81/9.43
[58] Field of Search ....................... 81/9.43, 9.42, 9.41

[56] References Cited

U.S. PATENT DOCUMENTS 2,313,793  3/1943  Wood .................................... 81/9.42
2,523,936  9/1950  Axelsen ................................. 81/9.42

Primary Examiner—Roscoe V. Parker
Attorney, Agent, or Firm—Michael J. Striker

[57] ABSTRACT

A stripping tool for electrical conductors has two legs turnable relative to one another against a spring force, clamping jaws arranged on free ends of the legs, cutters movable to a closed position by the clamping jaws in direction toward a conductor end to strip an insulation. A second one of the legs is movable in an elongated guide of the first one of the legs to turn relative to the first leg and to be moved in an alignment with the latter. One of the clamping jaws is arranged on a free end of the second leg at a side facing away of the first leg, the other of the clamping jaws cooperate with the one clamping jaw and also extends from a web of the first leg, engaging the second leg and forming a first bracket which is displaceable relative to the first leg. A second bracket is arranged in a fixed position at a distance from the clamping jaws from the first leg and engaging the second leg. The second bracket has a web supporting an upper one of the cutters which cooperates with a lower one of the cutters supported by the second leg.

19 Claims, 4 Drawing Sheets

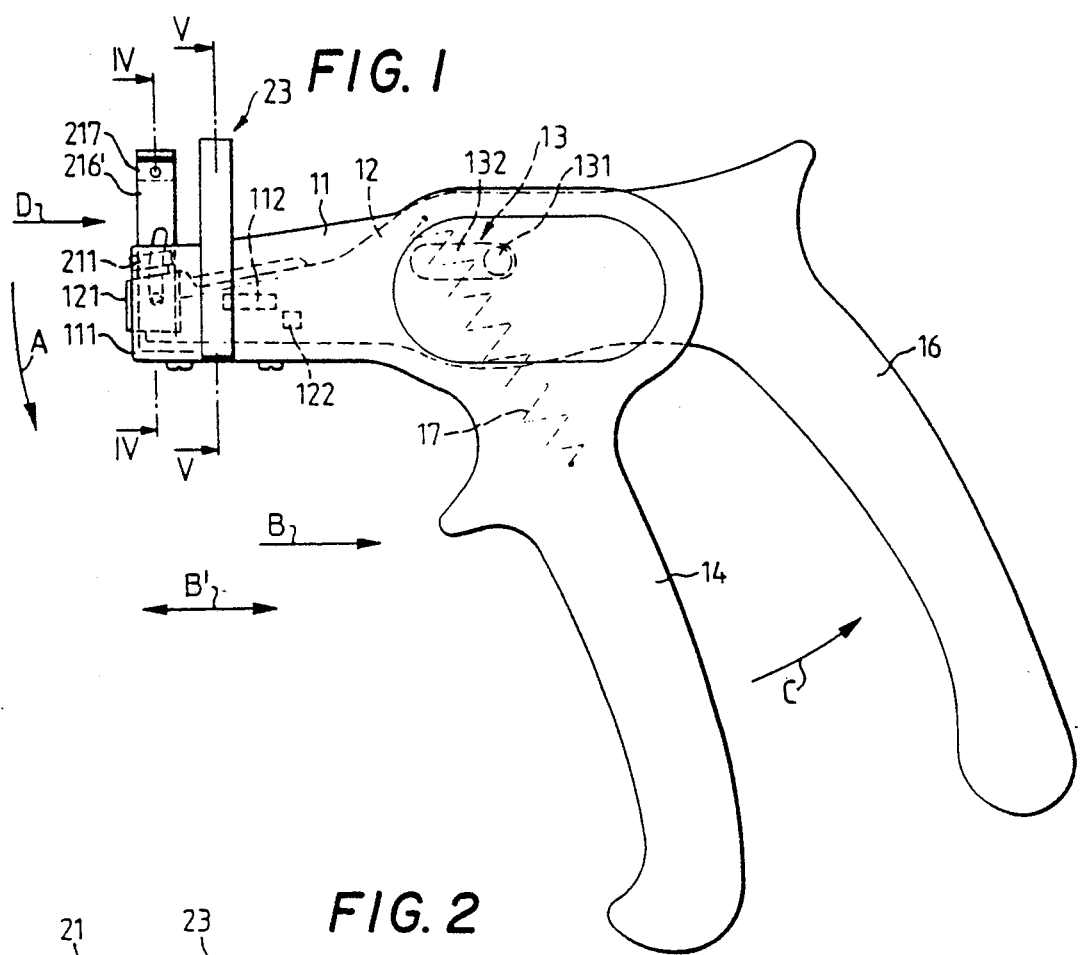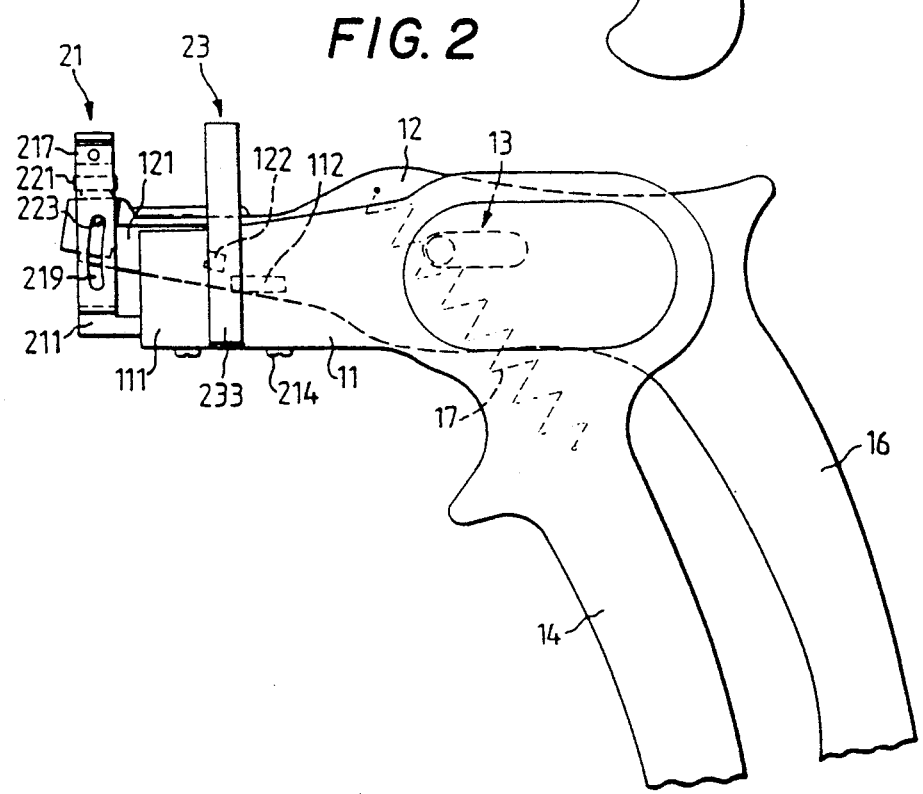

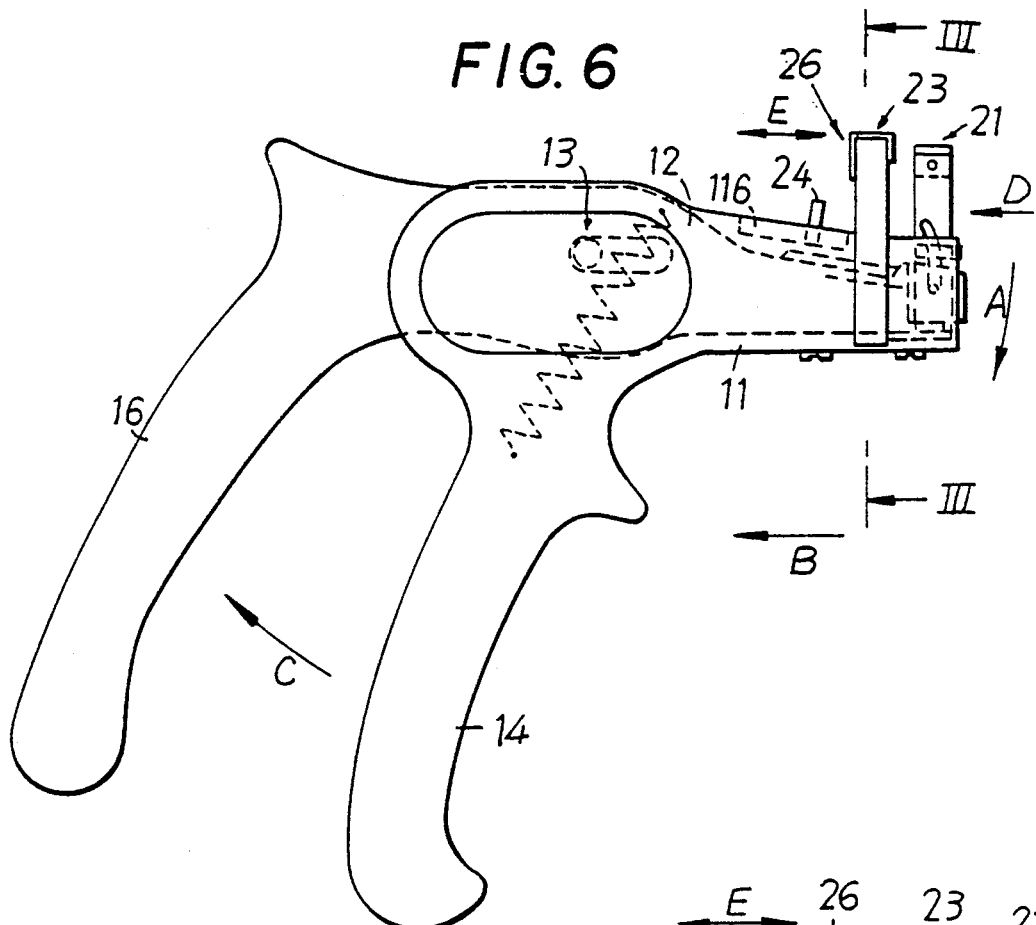
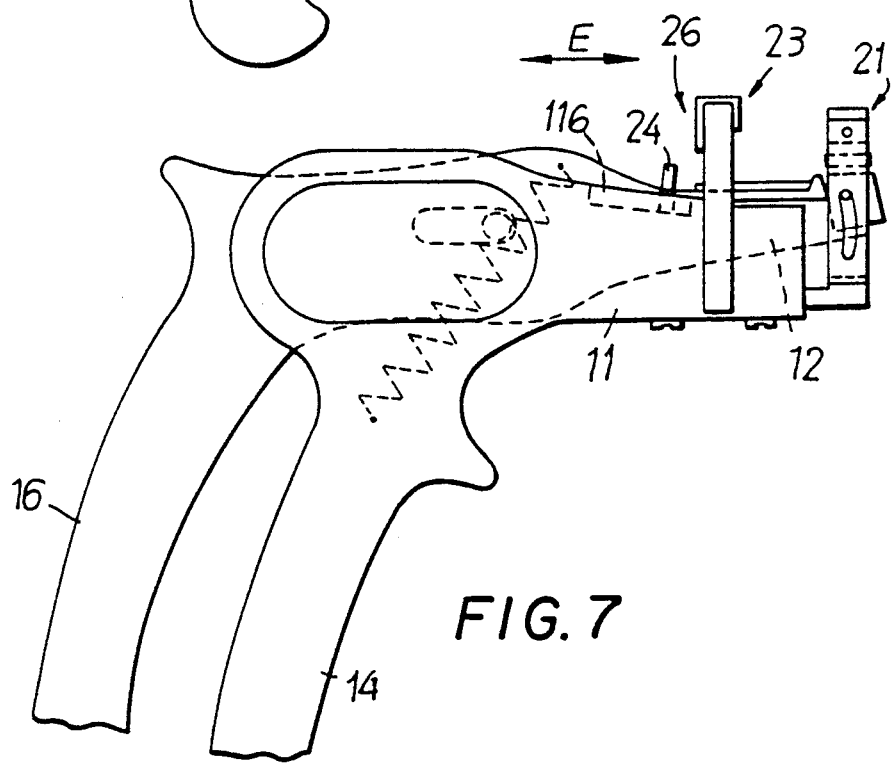

STRIPPING TOOL

BACKGROUND OF THE INVENTION

The present invention relates to a stripping tool or stripping tongs. More particularly it relates to a stripping tool which has two legs turnable relative to one another under the action of a spring force, clamping jaws arranged on the legs and cutters movable by the closed clamping jaws in direction toward a conductor end to strip the insulation.

Stripping tools of the above mentioned general type are known in the art. Such stripping tools are arranged for example in U.S. Pat. Nos. 2,313,793 and 2,523,936 as well as in German Patent 3,241,530. In the known stripping tools in accordance with the above mentioned U.S. Patents, the clamping jaws are associated with one leg so that its one clamping jaw is adjustable relative to another fixed clamping jaw, while the cutters are associated with the upper leg and include one cutter which is adjustable relative to the other fixed cutter. During the actuation of the stripping pliers first the adjustment of the adjustable clamping jaw is performed against the spring pressure, and the adjustment of the adjustable cutter is performed against the pressure of the same spring. Lifting of the leg which carries the cutters from the leg which carries the clamping jaws is then performed against the pressure of a further spring. The stripping of the separated insulation from the projecting portion of the conductor is performed by the cutting and pulling station. A significant disadvantage of these known stripping pliers is that it is structurally complicated as required by its operation. It is also disadvantageous that the conductor to be stripped must be transferred from the side in the stripping position between the clamping jaws as well as the cutting and stripping cutters. This undesirably affects the stripping in narrow spaces such as the stripping of the ends of the displaced conductors which are open in installation containers.

In the stripping tool in accordance with the German Patent 3,241,530 the stripping is performed with insulation separated by the cutting and stripping cutters extending parallel to the turning axis of the leg, from the conductor extending perpendicularly to the turning axis in the pliers' mouth. The stripping region available in the pliers' mouth is especially limited, and only a predetermined conductor cross-section is covered practically always with the same pliers. Moreover, the correct position of the conductor end to be stripped in the stripping region of the pliers is not controllable.

SUMMARY OF THE INVENTION

Accordingly, it is an object of the present invention to provide stripping tools or stripping pliers which avoid the disadvantages of the prior art with structurally low expenses.

In keeping with these objects and with others which will become apparent hereinafter, one feature of the present invention resides, briefly stated, in a stripping tool which has clamping jaws arranged on free ends of the legs, cutters movable to a closed position by the clamping jaws in direction toward a conductor end to strip an insulation, a second one of the legs movable in an elongated guide of the first one of the legs to turn relative to the first leg and to be moved in an alignment with the latter, wherein one of the clamping jaws is arranged on a free end of the second leg at a side facing away from the first leg, the other of the clamping jaws cooperates with the one clamping jaw, the other clamping jaw extends from a web of the first leg, engaging the second leg and forming a first bracket which is displaceable relative to the first leg, and a second bracket arranged in a fixed position at a distance from the clamping jaws from the first leg and engaging the second leg, the second bracket having a web supporting an upper one of the cutters which cooperates with a lower one of the cutters supported by the second leg.

When the stripping tool is arranged in accordance with the present invention it has a simple and inexpensive construction and at the same time provides for a reliable stripping of conductors in narrow spaces. The reason for this is that the conductor to be stripped is suppled to the pliers from its end side, which is connected between the legs, especially between the clamping jaws as well as the cutters with the further advantage as to orientability of the conductor. The clamping as well as the cutting and stripping regions located outside of the pliers' mouth provide in an advantageous manner a greater breadth of variance, suitable for different stripping regions of deviating conductor cross-sections.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a stripping tool in an initial position in accordance with the present invention;

FIG. 2 is a view showing the stripping tool of FIG. 1 in the end position of casing removal;

FIG. 6 is a view showing a first embodiment of the new stripping tool in an initial position;

FIG. 7 is a view showing the stripping tool of FIG. 1 in the end position with removed casing;

DESCRIPTION OF THE PREFERRED EMBODIMENTS

Figure 3:
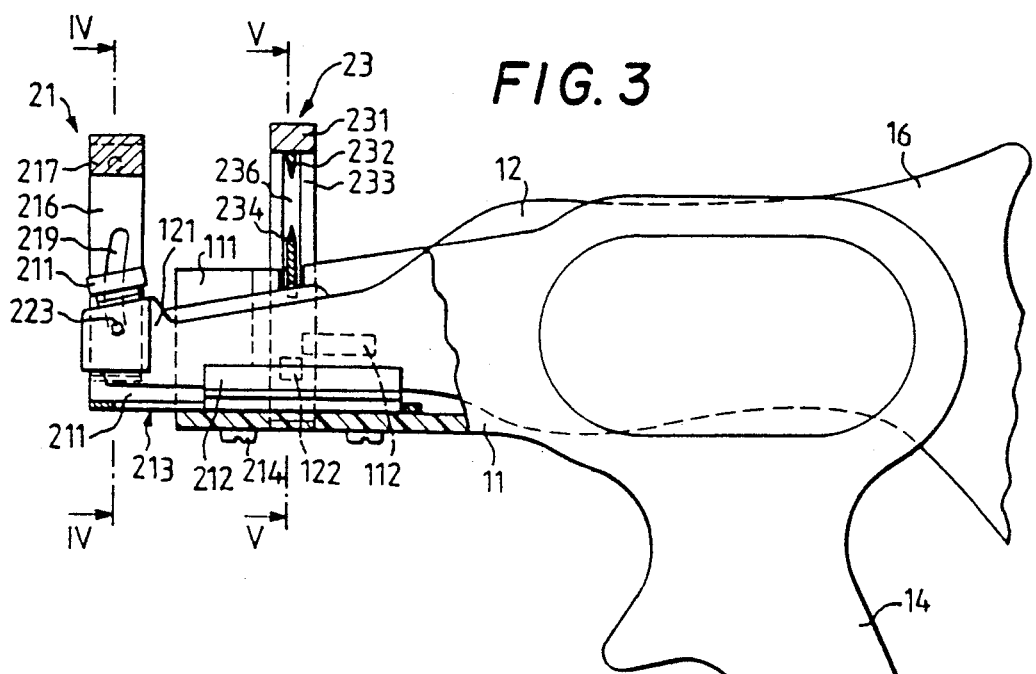
FIG. 3 is a view showing the stripping tool of FIGS. 1 and 2 in the first phase of the return in the initial position, partially broken and on an enlarged scale.

A striping tool in accordance with the present invention is formed as stripping pliers and includes two legs 11 and 12 which are hingedly connected with one another. The legs 11 and 12 extend over a connecting region 13 to form handles 14 and 16.

The second leg 12 which is guided in the first leg 11 is connected with the leg 11 by a cylindrical pin 131 which is rotatably supported in the leg 12. The pin 131 is guided in elongated openings 132 provided in the walls of the leg 11 which surround the second leg 12. The inner contours of the leg 11 and thereby the outer contours of the leg 12 providing alternating action in connection with the elongated guides formed by the pin 131 and the elongated openings 132 determine the movement course of the leg 11 relative to the leg 12 in directions of the arrows A and B during transfer of the pliers from the situation shown in FIG. 1 to the situation shown in FIG. 2. In other words, the movement course is determined during the actuation of the pliers by pulling the handle 14 relative to the handle 16 in direction of the arrow C. In the initial position which is shown in FIG. 1 the pliers is transferred from the situation shown in FIG. 2 by releasing of the handle 14 under the action of a return spring 17 which engages the leg 12 on the one hand and the handle 14 on the other hand.

Figure 4A:
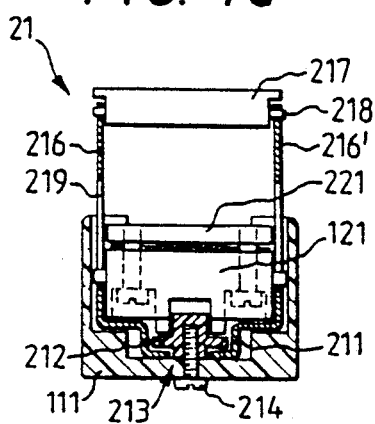
FIG. 4a is a view showing a section of the stripping tool taken along the line IV—IV in FIG. 1 or FIG. 3.
Figure 5A:
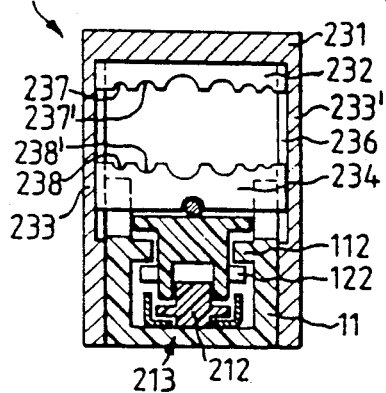
FIG. 5a is a view showing a section taken along the line V—V in FIG. 1 or FIG. 3.
Figure 4B:
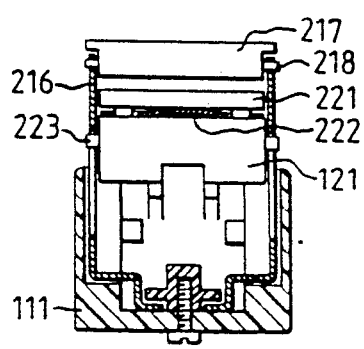
FIG. 4b is a view showing a section corresponding to the section of FIG. 4a in the situation according to FIG. 2.
Figure 5B:
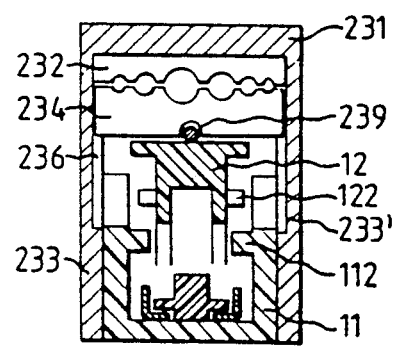
FIG. 5b is a view showing a section corresponding to the section of FIG. 5a in the situation according to FIG. 2.

A bracket 21 which engages a free end 111 of the leg 11 is associated with the leg 12. It is arranged on a beam 211 extending in the leg 11. A pressing down member 212 sits on the beam 211. The pressing down member 211 is fixed by a screw extending through the beam 211 in a longitudinal hole 213, relative to the leg 11 while maintaining its longitudinal removability and thereby the bracket 21 is adjustable relative to the leg 11 in direction of the double arrow B' as shown specifically in FIGS. 3 and 4. The web of the bracket 21 forms a clamping jaw 217 which is swingingly supported at 218 on the legs 216, 216'. The counter member to the clamping jaw 217 is formed by a clamping jaw 221 which is supported on free end 121 of the leg 12 guided in elongated hole 219 in the leg 216, 216' of the bracket at 223. The clamping jaw 221 is supported in a springy fashion on the side facing away of the leg 11.

A cutting and pulling device is arranged at a distance from the clamping region 21 and offset back in direction to the connecting region 13. It includes an upper cutter 232 supported by a web 231 of the bracket 23 associated with the leg 11, and also a lower cutter 234 which is guided in the legs 233, 233' of the bracket 23 and supported and liftable by the leg 12. The cutters 232, 234 have corresponding stripping regions 237, 237' . . . 238, 238' . . . which are designed for different sizes of conductors to be stripped. A connector 239 between the lower cutter 233 and the leg 12 insures the return of the lower cutter 234 to its initial position.

In order to perform stripping, the end of a respective conductor to be stripped is displaced in direction of the arrow D from the end side of the pliers first between the clamping jaws 217, 221 in their open position and then further between the cutters 232, 234 of the cutting and stripping region 23 located behind in an open position, until the region of the conductor to be stripped projects over the cutting and stripping device 232, 234 in correspondence with the region of the conductor to be stripped. Particularly, it is displaced with positioning of the conductor in the stripping region (for example 238') of the lower cutter 234, which corresponds to the respective conductor portion or the thickness of the insulation of the conductor. Then the handles 14, 16 of the legs 11, 12 are compressed, which leads to a turning of the handle 14 relative to the handle 16 in direction of the arrow C in FIG. 1. Under the action of the elongated guide 132 for the connecting pin 131 and the return spring 17, first a turning of the leg 11 in direction of the arrow A is performed. Thereby displacement of the upper clamping jaw 27 lying on the conduit is performed relative to the conduit lying on the lower clamping jaw 221. Then also the transfer of the lower cutter 234 of the cutting and pulling region 23 is performed through the leg 11 which supports the lower cutter 234 to a cutting position in which the upper and lower cutters 234, 232 cut the insulation of the contact. After the turning movement of the leg 11 in direction of the arrow A, during further compressing of the handle 14, 16, a displacement of the leg 11 is performed in direction of the arrow B in alignment with the leg 11. The separated insulation is pulled by the interengaging cutters 232, 234 from the projecting portion of the conduit or the cutters 232, 234. When the pliers is opened the conductor with the stripped end is removed from the pliers.

A block is provided for projections 122 extending from the leg 12 and for corresponding projections 112 located above the level of the projections 122 and projecting laterally from the leg 11. They insure that during actuation of the pliers in every case first a complete turning of the leg 11 in direction of the arrow A and thereby clamping of the conductor in the clamping region 21 is performed before it comes for displacement of the leg 11 relative to the leg 12 in direction of the arrow B, when the projection 112 moves over the projection 122. Also, the block insures that the return of the leg 11 to its initial position is performed first when the leg 11 is turned back against the leg 12, the projection 122 moves over the leg 12 and the projection 112 moves over the leg 11.

Figure 9:
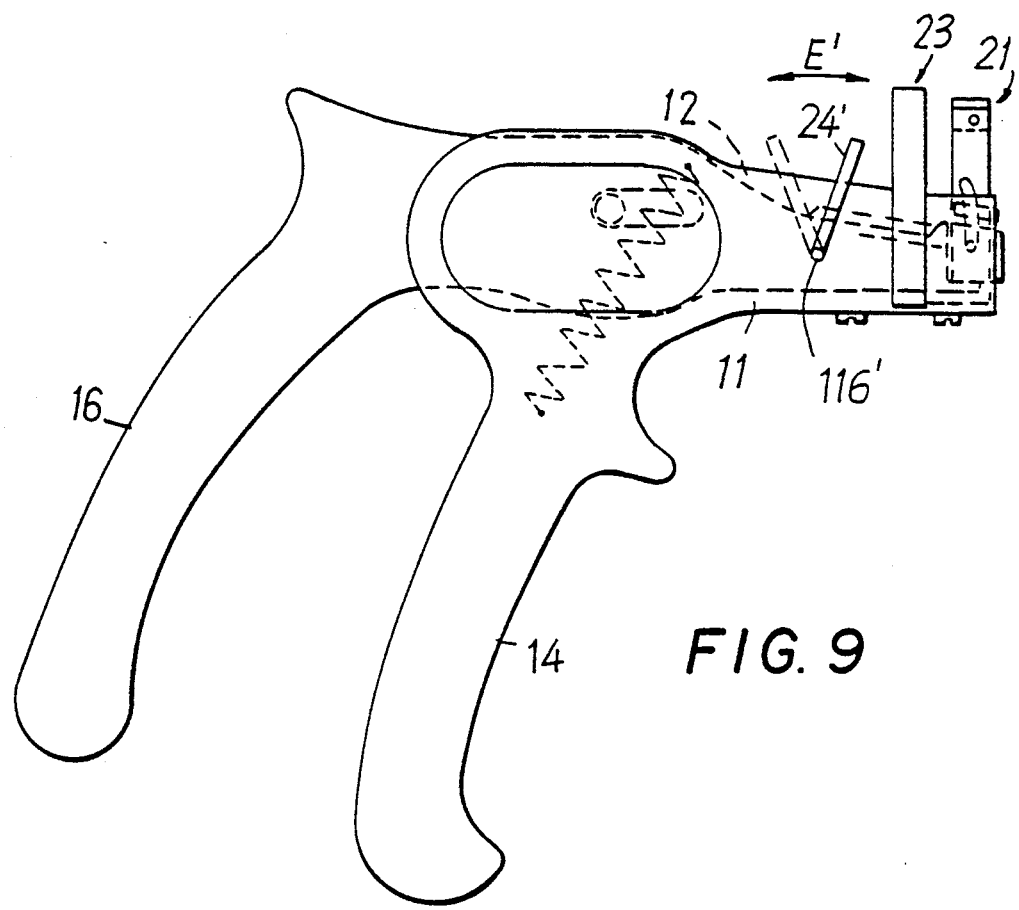
FIG. 9 is a view substantially corresponding to the view of FIG. 1 but showing a further embodiment of the stripping tool.
Figure 8:
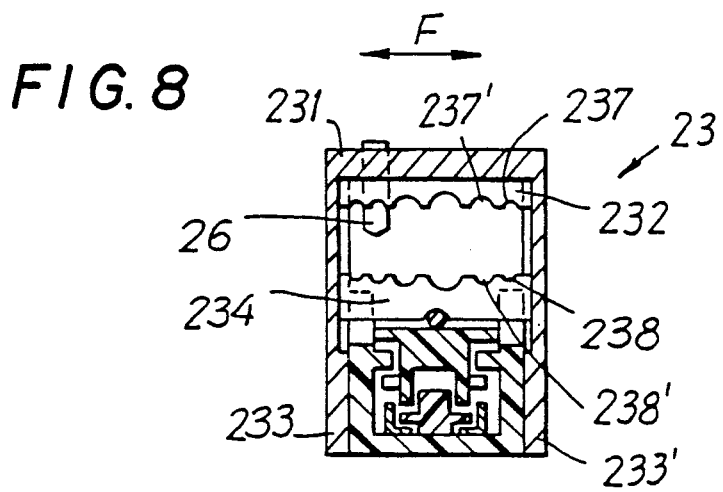
FIG. 8 is a view showing a section taken along the line III—III in FIG. 1.

The length of the end region of the conductor with removed insulation is determined by an abutment 24 which is transverse to the leg and displaces on the leg 11 in direction of the double arrow E relative to the conductor end extending outwardly beyond the cutting and pulling device 23. As can be seen from FIGS. 6 and 7, the abutment 24 is guided in the elongated openings 116, while, as can be seen from FIG. 9, the abutment 24 is supported at 116' on the leg 11 turnably in direction of the arrow E'.

It will be understood that each of the elements described above, or two or more together, may also find a useful application in other types of constructions differing from the types described above.

While the invention has been illustrated and described as embodied in a stripping tool for electrical conductors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A stripping tool for electrical conductors, comprising two legs turnable relative to one another against a spring force; clamping jaws arranged on free ends of said legs; cutters movable to a closed position by said clamping jaws toward a conductor end to strip an insulation, a second one of said legs being movable in an elongated guide of the first one of said legs to turn relative to said first leg and to be moved in an alignment with the latter, one of said clamping jaws being arranged on a free end of said second leg at a side facing away from said first leg, the other of said clamping jaws cooperating with said clamping jaw, a first bracket extending from a web of said first leg and carrying said other clamping jaw and being displaceable relative to said first leg, and a second bracket arranged in a fixed position at a distance from said clamping jaws along said first leg, said second bracket having a web supporting an upper one of said cutters which cooperates with a lower one of said cutters supported by said second leg.

2. A stripping tool as defined in claim 1; and further comprising a beam displaceable in alignment with said first leg and extending along said first leg, said first bracket forming a part of a clamping region and being arranged on said beam, said other clamping jaw arranged on said second leg being guided on elongated openings formed in legs of said first bracket.

3. A stripping tool as defined in claim 2, wherein said elongated openings in said legs of said first bracket are curved.

4. A stripping tool as defined in claim 1, wherein said at least one of said clamping jaws is suspended in a swingable fashion.

5. A stripping tool as defined in claim 1, wherein at least one of said clamping jaws is supported in a springy fashion.

6. A stripping tool as defined in claim 1, wherein one of said cutters is a lower cutter liftable by said second leg and connected with said second leg.

7. A stripping tool as defined in claim 1, wherein said second bracket extends from said first leg and has bracket legs, said cutters including a lower cutter which is guided in said bracket legs of said second brackets.

8. A stripping tool as defined in claim 1, wherein said cutters have a plurality of stripping regions formed for different conductor cross-sections.

9. A stripping tool as defined in claim 1, wherein said clamping jaws have a plurality of clamping regions corresponding to different conductor cross-sections.

10. A stripping tool as defined in claim 1, wherein said cutter has a stripping region designed for a web insulation.

11. A stripping tool as defined in claim 1, wherein said cutters and said clamping jaws are exchangeable.

12. A stripping tool as defined in claim 1; and further comprising a pin which is supported in a rotary manner in said second leg and projects into elongated holes in said first leg which engages said second leg.

13. A stripping tool as defined in claim 1, wherein said brackets have bracket webs which are formed by one of said upper clamping jaw and said upper cutter.

14. A stripping tool as defined in claim 1; and further comprising means for adjusting a stroke of the tool.

15. A stripping tool as defined in claim 1, wherein said first leg has an abutment intersecting said first leg and having an adjustable distance from said cutters.

16. A stripping tool as defined in claim 1; and further comprising an abutment which is guided in a self-locking manner in elongated guides of said first leg.

17. A stripping tool as defined in claim 1; and further comprising an abutment which is self-lockingly turnable on said first leg about an axis extending transverse to said first leg.

18. A stripping tool as defined in claim 15; and further comprising liftable arresting grips between said first leg and said abutment.

19. A stripping tool as defined in claim 1, wherein said second bracket has a web; and further comprising an indicator supported on said web of said second bracket and displaceable along said web for marking a predetermined stripping region.

* * * * *